United States Patent [19]

Zahid

[11] 3,857,413

[45] *Dec. 31, 1974

[54] PRESSURE PULSE DAMPENER DEVICE

[75] Inventor: Abduz Zahid, Monterey Park, Calif.

[73] Assignee: Greer Hydraulics, Inc., Los Angeles, Calif.

[ * ] Notice: The portion of the term of this patent subsequent to Jan. 1, 1991, has been disclaimed.

[22] Filed: Oct. 12, 1973

[21] Appl. No.: 405,914

Related U.S. Application Data

[63] Continuation-in-part of Ser. No. 195,243, Nov. 3, 1971, Pat. No. 3,782,418.

[52] U.S. Cl. ........................ 138/26, 138/30, 137/207
[51] Int. Cl. ............................................. F16l 55/04
[58] Field of Search .......... 138/26, 30, 31; 137/207

[56] References Cited
UNITED STATES PATENTS 3,169,551   2/1965   Lewis .................................... 138/26

*Primary Examiner*—Donald O. Woodiel
*Assistant Examiner*—Anthony V. Ciarlante
*Attorney, Agent, or Firm*—Arthur B. Colvin

[57] ABSTRACT

The invention relates to a pressure pulse dampener device comprising a pressure vessel having a movable partition therein defining two chambers, each having a port in communication therewith, one of the ports defining a gas port for charging of one of said chambers with gas under pressure and the other an oil port, said oil port having a hollow fitting rigidly secured thereto, said fitting having an inlet port and an outlet port, the fitting having means therein defining a tortuous path for oil under pressure from said inlet port to said outlet port, the oil port being in communication with the tortuous path and means are provided in the fitting to afford a direct path for flow of oil from said inlet port to the outlet port of a portion of the oil under pressure entering the inlet port and for varying the cross sectional area of a portion of said path to restrict the flow of such oil.

6 Claims, 6 Drawing Figures

3,857,413

PRESSURE PULSE DAMPENER DEVICE

This application is a continuation-in-part of copending application Ser. No. 195,243, filed Nov. 3, 1971 and now U.S. Pat. No. 3,782,418.

As conducive to an understanding of the invention, it is noted that where a hydraulic system utilizes a reciprocating type pump, more particularly of the piston type, due to the action of such pump, pulses are generated whose frequency is dependent upon the number of pistons in the pump and the speed thereof and whose amplitude is determined by the amount of oil displaced by each of the pistons.

Under many conditions of operation, the pulse frequency and/or the amplitude may be extremely high. As a result, if these high frequency large amplitude pulses are permitted to propagate through the entire hydraulic system without control, noise in the system is created and the repeated shocks imparted to the components of the system, such as piping, fittings, valves, etc., could cause leakage and possible breakage of lines and damage to the system components.

In addition, unless controlled, due to the frequencies and amplitude of the pulses, harmonics could be created causing amplification of the amplitude of such pulses with resultant enhanced likelihood of damage to the system.

Where, to minimize the amplitude of the pulses a pressure vessel is provided connected directly to the line through which the pulsating oil is flowing so that the pulses can be dampened by compressing the gas in the pressure vessel, unless a substantial portion of the pulsating oil is able to react against the gas in the pressure vessel, the dampening effect will be minimal.

To solve the foregoing problems, there has been provided a pressure pulse dampener device which includes a pressure vessel having a movable partition therein defining a gas chamber in communication with the gas port of the pressure vessel and an oil chamber in communication with the oil port of the pressure vessel. The oil port has a hollow fitting secured thereto, the fitting having an inlet and an outlet and having means therein including a partition between said inlet and outlet to provide a tortuous path for oil under pressure from said inlet to said outlet, said oil port being in communication with said tortuous path, said partition having an opening of a fixed diameter therethrough providing a direct path from said inlet to said outlet for a portion of the oil under pressure entering said inlet.

As a result of this arrangement, it has been found that a major portion of the pulsating oil passing through such fluid line will react against the compressed gas in the pressure vessel to minimize the amplitude of the pulsations, yet with a minimum pressure drop between the oil under pressure leaving the outlet.

Although the device above described has been found to be highly efficient in most applications, there are conditions where it may be desirable to vary the relationship between pulse dampening and pressure drop. Thus, the greater the pulse dampening effect the greater will be the pressure drop between the inlet and the outlet and under certain conditions adjustment of the relationship is desirable for most optimum operation.

Where, to vary the relationship between pulse dampening and pressure drop, a plurality of different pulse dampener devices are provided each with partitions in the tortuous path having different diameter openings therethrough, and a particular device is selected to be connected in the hydraulic circuit to provide the optimum operation, the cost of having a number of idle devices on hand is prohibitive.

Furthermore, unless an extremely large number of pulse dampening devices were available, each with a different diameter opening, most efficient operation might not be achieved as the selected device might not have the precise diameter opening desired.

In addition, the cost of connecting the desired device into circuit would also be uneconomical, particularly since the system would be inoperative during this period.

It is accordingly among the objects of the invention to provide a pressure pulse dampener device which includes a pressure vessel having a movable partition therein defining a gas chamber in communication with the gas port of the pressure vessel and an oil chamber, the latter being in communication with the fluid line through which the pulsating oil will flow and which will insure that a major portion of the pulsating oil passing through such fluid line will react against the compressed gas in the pressure vessel to minimize the amplitude of the pulsations and which device will have a minimum pressure drop between the oil under pressure entering the device and the oil under pressure leaving the device and which will permit infinite adjustment of the relationship between pulse dampening and pressure drop with a simple adjustment without need for disconnecting the device from the system or for any downtime of the system.

According to the invention, these objects are accomplished by the arrangement and combination of elements hereinafter described and more particularly recited in the claims.

In the accompanying drawings in which is shown one or more various possible embodiments of the several features of the invention;

Figure 1:
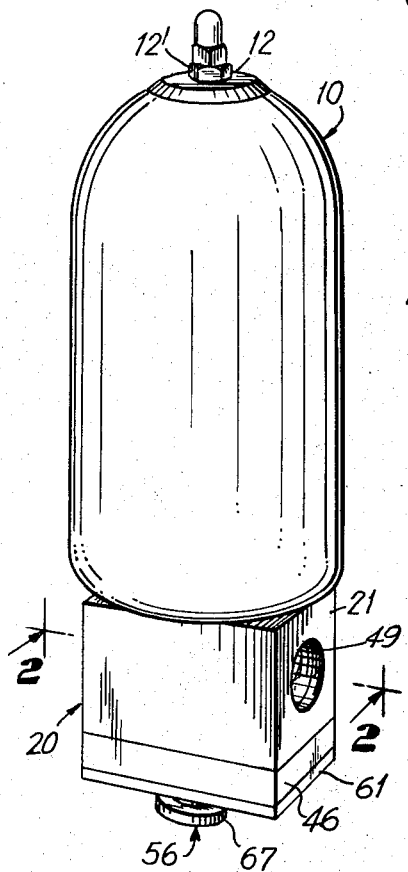
FIG. 1 is a persepctive view of the device according to one embodiment of the invention.

Referring now to the drawings, the pressure pulse dampener device shown in FIGS. 1 to 4, to illustrate the invention, desirably comprises a pressure resistant vessel illustratively a rigid shell 10 having opposed ports 11, 12 therein, one of said ports, illustratively port 12 being of smaller diameter than the other. Desirably, the smaller diameter port 12 is provided with the stem (not shown) of a standard pneumatic valve which is affixed to the shell by nut 12', and the larger diameter port 11, which serves as the oil port, is formed large enough to pass an accumulator bladder 13 therethrough.

The bladder 13 which is formed of resilient material such as rubber or synthetic plastic of like physical characteristics is capable of collapsing or expanding in use and in distended but substantially unstretched condition is smaller than the cavity of the shell 10. The bladder thus defines two chambers 14, 15 in the shell adapted to be charged with gas and oil respectively under pressure.

Associated with the port 11 is an oil port fitting 20 which illustratively comprises a rectangular block 21 which has a cylindrical recess 22 therein having its floor 23 located adjacent the bottom surface 24 of the block and having its mouth 25 coaxial with and extending through an annular flange or nipple 26 rising from the top surface 27 of the block.

The nipple 26 is of outer diameter just slightly smaller than that of oil port 11 so that it may readily fit therein and the block is secured to the container as by welding at 31 to provide a liquid-tight seal.

The cylindrical recess 22 has a partition 32 extending diametrically thereacross defining chambers A and B on opposite sides thereof, said partition illustratively being formed integral with block 21. The partition rises from the floor 23 of recess 22 and the upper edge 34 of the partition 32 lies in a plane positioned outwardly of the valve seat 35 defined by the inner surface of nipple 26, the valve member or button 36 carried by bladder 13 being adapted to abut against seat 35 to cut off flow from chamber 15 as will be hereinafter described.

Figure 2:
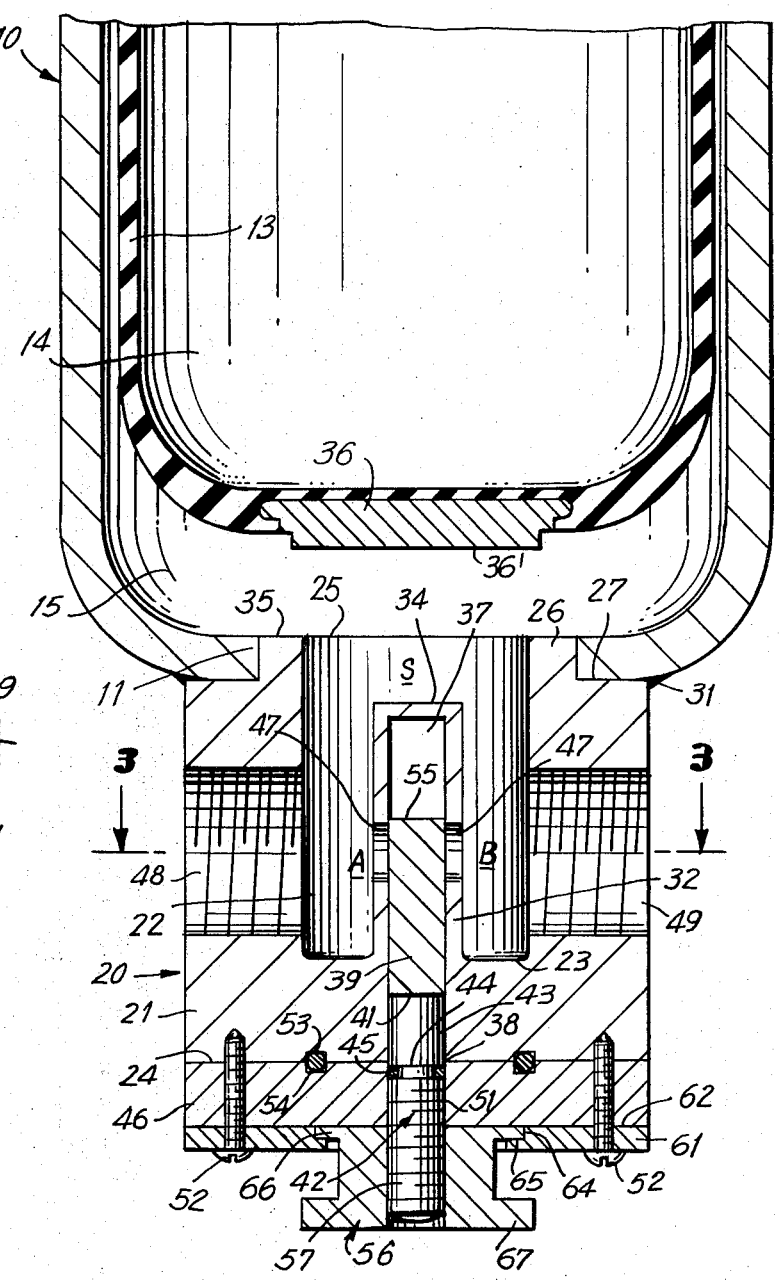
FIG. 2 is a fragmentary sectional view on an enlarged scale taken along line 2—2 of FIG. 1.
Figure 3:
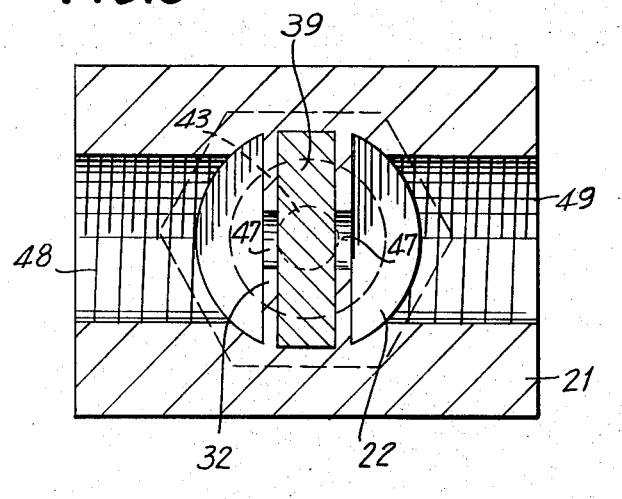
FIG. 3 is a sectional view taken along line 3—3 of FIG. 2.
Figure 4:
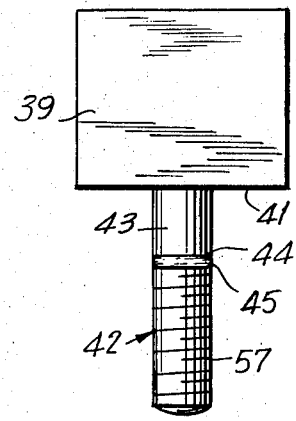
FIG. 4 is a plan view of the adjustment member of the embodiment of FIGS. 1 to 3.

As shown in FIGS. 2 and 3, the partition 32 is hollow, defining a rectangular cavity 37, the lower edge 38 of which extends to the bottom surface 24 of block 21.

Positioned in cavity 37 is a rectangular valve plate 39 which is free to slide in cavity 37 with a minimum of clearance. The lower edge 41 of plate 39 has rigidly secured thereto and centrally located thereon, an adjustment stem 42 the root end portion 43 of which is cylindrical and unthreaded and has an annular groove 44 in which an O-ring 45 is positioned.

Secured to the bottom surface 24 of block 21 is a rectangular plate 46 of thickness just slightly greater than the diameter of openings 47 extending transversely through partition 32, said openings being axially aligned with inlet port 48 leading into recess 22 of one side of partition 32 and outlet port 49 leading out of recess 22 on the other side of partition 32.

The plate 46 has an unthreaded opening or bore 51 through which the stem 42 extends and the plate 46 is secured to the undersurface of block 21 by screws 52.

Desirably, adjacent surfaces of the block 21 and plate 46 have complementary annular grooves 53 in which an O-ring 54 is positioned to define a seal.

It is to be noted that when the free edge 55 of plate 39 is aligned with the upper edge of openings 47 to close the latter, the O-ring 45 is at the inner end of the cylindrical bore 51 in plate 46 to define a seal.

To permit movement of plate 39 so that the openings 47 can be exposed as desired, an adjustment nut 56 is screwed on the threaded end 57 of stem 42. To retain the plate 37 in set position, a retainer plate 61 is secured to the undersurface 62 of plate 46 by screws 52. The plate 61 has a large central opening 63 coaxial with stem 42 and which is recessed at 64 to define an annular shoulder 65.

The nut 56 has an annular flange 66 at its inner end which freely rests on shoulder 65. The outer end of nut 50 also has an annular flange which is knurled for ready rotation of the nut.

OPERATION

In operation of the pressure pulse dampener device, above described, the bladder 13 is first precharged with gas under pressure through the valve in port 12 and the valve is then closed. The charged expanded bladder will move downwardly, referring to FIG. 2, so that the valve member 36 will move against its seat 35 preventing extrusion of the bladder 13 into the mouth 25 of recess 22.

The port 48 of the pulse dampener device is connected to a pump which supplies oil under pressure from a suitable reservoir for example. The port 49 is connected to the hydraulic system to be supplied with oil under pressure.

As the pump operates, oil under pressure greater than that in the precharged bladder 13 will flow into port 48, through chamber A, into oil chamber 15 and across the space S between the inner end 34 of partition 32, and the undersurface 36' of the valve member 36, then through chamber B out of port 49 into the hydraulic system.

In addition, due to the fact that the pressure of the oil in normal operation urging the valve member 36 to open position is greater than the pressure in bladder 13, the valve member 36 will be moved off its seat 35 and the chamber 15 of the pressure vessel will charge with oil under pressure compressing the bladder and the gas contained therein.

As the pump operates it delivers oil under pressure at a pulse frequency dependent upon the type of pump employed. More particularly, the pumps are generally of the reciprocating piston type and the pulse frequency is dependent upon the number of pistons in the pump and the speed thereof. In addition, the amplitude of the pulses may be considerable, being dependent upon the oil displaced by each piston.

Unless controlled, these high frequency large amplitude pulses would propagate through the entire system and the repeated shocks imparted to the components of the system such as pipes, fittings, valves, etc. could cause leakage and possible breakage of lines and damage to the system components.

In addition, unless controlled, due to the frequency and amplitude of the pulses, harmonics could be created causing amplification of the amplitude of such pulses with resultant enhanced likelihood of damage to the system.

By reason of the unique design of the pressure pulse dampener device herein described, such problems are greatly alleviated.

In initially setting the device for operation, the nut 56 is rotated to cause the plate 39 to move outwardly to expose a portion of openings 47.

It is to be noted that substantially all of the pulsating oil under pressure which flows into the inlet port 48, does not flow directly out of outlet port 49 but is guided in a tortuous path. Thus, the majority of the oil that flows into port 48 has its direction changed at right angles as it strikes the partition 32 so that it will flow through said chamber A into the chamber 15 of the pressure vessel to react against the bladder and then the oil will flow out of said chamber 15 into chamber B out of port 49. In addition, the oil will also flow transversely across the space S and turn at right angles to flow through chamber B.

It is apparent that except for the relatively small quantity of oil that flows directly from port 48, through openings 47 and port 49, substantially all of the oil will flow in the tortuous path above described from port 48 to port 49 and hence the pulsations in such oil will react against the inflated bladder 13 causing reduction in the amplitude of the pulses by converting the pulse energy into potential energy in the form of the compressed gas in the bladder.

It is to be noted that although the amplitude of the pressure pulses is greatly reduced by the arrangement above described, the turbulence created by the sharp changes of direction of oil flow, causes a pressure drop between the input port and output port. Under some conditions such pressure drop may be below the value described with a given input pressure into port 48.

The turbulence is most pronounced adjacent the outlet port 49 due to the fact that the oil changes its direction 90° as it flows through port 48 into chamber A and again as it flows through chamber B and out of port 49.

The problem of pressure drop is alleviated by the openings 47 in partition 32.

Thus as previously noted, such openings provide a direct path for flow of the oil under pressure from port 48 to port 49 which reduces the pressure drop that would otherwise be present in the absence of such openings.

More particularly, this is due to the fact that the direct flow of a portion of the oil through the openings 47 tends to reduce the turbulence existing in chamber B adjacent the outlet port 49 by imparting a laminar flow directly out of port 49.

Thus, the diameter of openings 47 is less than that of port 48 so that the velocity of the oil flowing through openings 47 into chamber A will be increased and the high speed jet of oil passing through the oil adjacent port 49 will tend to smooth out such turbulence due to the laminar flow that is created which reduces the turbulence and hence reduces the pressure drop adjacent the outlet port 49.

Since the amplitude of the pulses in the oil flowing in chamber B and discharging through outlet port 49 has already been reduced by the energy absorbing action of bladder 13 in pressure vessel 10, the resultant output flow of oil will have the pulses dampened to an acceptable level and the pressure drop will also be at an acceptable level.

By selection of the optimum size for openings 47 based on the physical parameter of the oil port assembly and the pump capacity and required output pressure, the system will provide the desired output pressure with the pulse amplitude dampened to an acceptable value. Such selection is readily accomplished by merely turning nut 56 so that the plate 39 will move up or down as desired.

Figure 5:
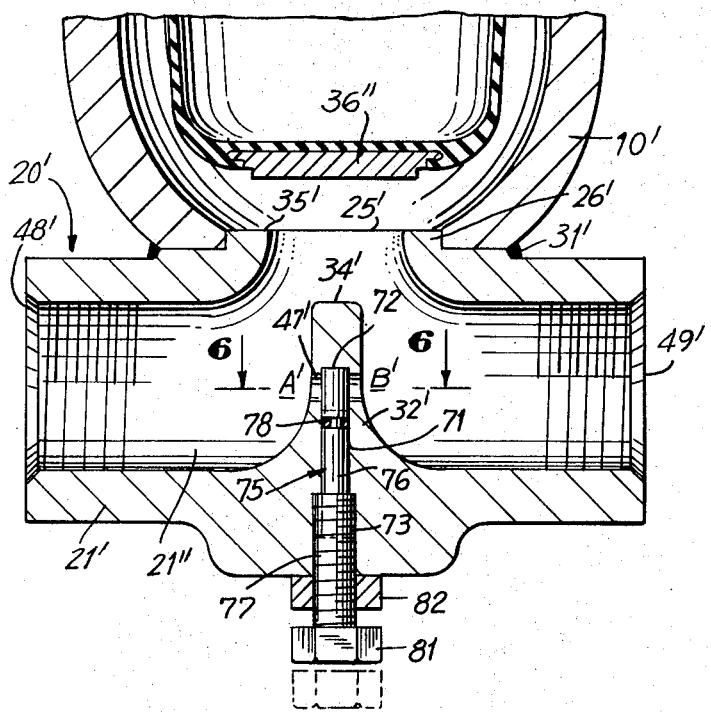
FIG. 5 is a fragmentary sectional view of another embodiment of the invention.
Figure 6:
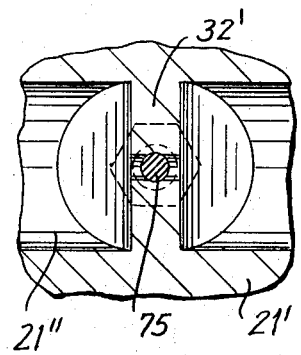
FIG. 6 is a sectional view taken along line 6—6 of FIG. 5.

The embodiment shown in FIGS. 5 and 6 is similar in many respects to the embodiment of FIGS. 1 to 4 and corresponding parts are primed.

Referring to FIG. 5, an oil port fitting 20' is provided in the form of a tubular sleeve 21' which has an inlet port 48' at one end and an outlet port 49' at its other end.

The fitting 21' has a transverse opening or mouth 25' coaxial with and extending through an annular flange or nipple 26' extending outwardly from fitting 21'.

The nipple 26' is of outer diameter just slightly smaller than that of oil port 11' so that it may readily fit therein and the tubular fitting 21' is secured to the container 10' as by welding at 31' to provide a liquid-tight seal.

The bore 21'' of fitting 21' has a partition 32' extending diametrically thereacross defining chambers A' and B' on opposite sides thereof, said partition 32' illustratively being formed integral with fitting 21'. The partition rises from the wall of fitting 21' remote from mouth 25' and is centrally located with respect thereto.

The upper edge 34' of the partition 32' lies in a plane positioned outwardly of the valve seat 35' defined by the inner surface of nipple 26', the valve member 36'' being adapted to abut against valve seat 35'.

The partition has a transverse bore or opening 47' therethrough illustratively axially aligned with inlet 48' and outlet 49'.

In addition, the partition 32' has a bore 71 extending diametrically with respect to fitting 21'. The inner end 72 of bore 71 terminates just beyond the bore 47', the outer portion 73 of bore 71 is of enlarged dimaeter and is threaded as shown.

A stem 75 is provided having an unthreaded inner portion 76 and a large diameter outer portion 27 which is externally threaded to coact with the threaded portion 73.

The portion 76 has an annular groove in which an O-ring seal 78 is positioned and the outer end of portion 77 has a head 11 rigid therewith, a lock screw 82 also being provided.

To adjust the size of opening 47', it is merely necessary to rotate the stem 75 and then lock the latter by rotating lock nut 82.

As the operation of the embodiment shown in FIGS. 5 and 6 is identical to that shown in FIGS. 1 to 4, no further description will be given.

Having thus described my invention, what I desire to secure by Letters Patent of the United States is:

1. A pressure pulse dampener comprising a pressure vessel having a movable partition therein defining two chambers each having a port in communication therewith, one of said ports defining a gas port for charging of one of said chambers with gas under pressure and the other an oil port, valve means controlled by the movement of said partition to close said oil port, an oil port fitting comprising a hollow member having an opening axially aligned with said oil port and being rigidly secured thereto and in communication therewith, said member having a fixed partition therein defining two chambers, said fixed partition extending longitudinally of said oil port and being substantially axially aligned therewith, each chamber in said hollow member having one end spaced outwardly from said oil port, said member having two spaced openings extending thereinto and in communication respectively with said chambers, said fixed partition having fluid passage means therethrough aligned with said two openings, whereby a first tortuous path is provided for oil under pressure from one of said openings to the other of said openings, said oil port being in communication with said tortuous path, and a second direct path is provided by said fluid passage means from one of said openings to the other of said openings for a portion of the oil under pressure entering said first spaced opening and means to vary the size of said fluid passage means.

2. The combination set forth in claim 1 in which the opening axially aligned with said oil port has a peripheral flange defining a valve seat and said valve means comprises a valve member movable against said valve seat to close said opening.

3. The combination set forth in claim 1 in which said oil port assembly comprises a block having a cylindrical recess therein having a floor at one end and a mouth at its other end, the mouth of said recess being secured to said oil port, said fixed partition rising from the floor of said recess and extending diametrically across the latter, said block having a pair of transversely spaced bores extending at right angles to said partition, said openings being at the outer ends of said bores respectively and defining an inlet and outlet port respectively, said fixed partition being hollow and having a bore extending therethrough at right angles thereto axially aligned with said openings and defining said fluid passage means, and a plate slidable in said partition to vary the effective area of the bore through said partition.

4. The combination set forth in claim 3 in which said fixed partition has a rectangular cavity therein, said plate is rectangular and has a stem extending from its outer edge axially aligned with the mouth of said recess, said stem has a threaded portion at its end, a nut rotatable on said threaded end, means to retain axial movement of said nut but to permit rotation thereof, whereby upon rotation of said nut, said plate will be moved to vary the effective area of the bore through said partition.

5. The combination set forth in claim 1 in which said oil port assembly comprises a hollow sleeve having a bore therethrough with an opening at each end defining an inlet and outlet port respectively, said sleeve having a transverse opening between its ends secured to said oil port, said fixed partition rising from the wall of the sleeve remote from said transverse opening, said fixed partition having a bore therethrough extending at right angles thereto and axially aligned with the inlet and outlet ports, said partition having a bore extending axially of said transverse opening, one end of said axial bore extending through the other bore, nd a valve stem movable in said axial bore to vary the effective area of said other bore.

6. The combination set forth in claim 5 in which said valve stem is externally threaded and the outer end of said axial bore in said partition is correspondingly threaded, whereby upon rotation of said stem the inner end thereof will move axially in said bore to vary the effective area of said other bore.

* * * * *